United States Patent [19]

Campbell

[11] Patent Number: 4,670,758
[45] Date of Patent: Jun. 2, 1987

[54] DEPRESSION ANGLE RANGING SYSTEM AND METHODS

[75] Inventor: John M. Campbell, Edmonds, Wash.

[73] Assignee: The Boeing Company, Seattle, Wash.

[21] Appl. No.: 655,704

[22] Filed: Sep. 28, 1984

[51] Int. Cl.⁴ ............................................. G01S 13/08
[52] U.S. Cl. ....................................... 342/458; 342/13
[58] Field of Search ...................... 343/15 R, 450, 458, 343/461, 12 R, 11 VB; 342/123, 121, 126, 133, 148, 158

[56] References Cited

U.S. PATENT DOCUMENTS

| | | | |
|---|---|---|---|
| 2,415,094 | 2/1947 | Hansen et al. | 342/158 |
| 2,646,563 | 7/1953 | Stabler | 342/123 |
| 2,837,738 | 6/1958 | Van Valkenburgh | 342/13 X |
| 3,078,459 | 2/1963 | Vadus et al. | 342/123 |
| 3,154,783 | 10/1964 | Kerdock | 342/203 |
| 3,171,126 | 2/1965 | Wiley | 342/458 |
| 3,182,328 | 5/1965 | Hings | 342/33 |
| 3,210,762 | 10/1965 | Brabant | 342/362 |
| 3,212,091 | 10/1965 | Bissett et al. | 342/453 |
| 3,218,642 | 11/1965 | Newhouse et al. | 342/13 X |
| 3,242,491 | 3/1966 | Winter | 342/33 |
| 3,267,469 | 8/1966 | Vadus | 342/123 |
| 3,320,615 | 5/1967 | Albright et al. | 342/453 |
| 3,328,565 | 6/1967 | Prichodjko | 364/456 |
| 3,337,869 | 8/1967 | Bernstein et al. | 342/123 |
| 3,398,268 | 8/1968 | Prichodjko et al. | 342/453 |
| 3,560,973 | 2/1971 | Kazel | 342/458 |
| 3,696,418 | 10/1972 | Litchford | 342/123 |
| 3,721,986 | 3/1973 | Kramer | 342/453 |
| 3,863,257 | 1/1975 | Kang et al. | 342/458 |
| 3,939,476 | 2/1976 | Leopard et al. | 342/464 |
| 3,943,514 | 3/1976 | Afendykiw et al. | 342/156 |
| 4,068,237 | 1/1978 | Jones, Jr. | 342/13 X |
| 4,268,167 | 5/1981 | Alderman | 356/1 |
| 4,316,193 | 2/1982 | Jones et al. | |
| 4,339,755 | 7/1982 | Wright | 342/458 |
| 4,370,656 | 1/1983 | Frazier et al. | 342/458 |
| 4,393,382 | 7/1983 | Jones | |
| 4,433,334 | 2/1984 | Caputi, Jr. | 343/450 |
| 4,558,323 | 12/1985 | Golinsky | 343/458 |
| 4,589,770 | 5/1986 | Jones et al. | |

Primary Examiner—Theodore M. Blum
Assistant Examiner—John B. Sotomayor
Attorney, Agent, or Firm—Finnegan, Henderson, Farabow, Garrett & Dunner

[57] ABSTRACT

A system and related methods for passively detecting range and/or elevation of a signal emitting target by employing an X-beam antenna system which has a fixed angle $\theta$ between planes of receipt and which rotates those planes of receipt at a rate of sweep $\gamma$. A first correlator is employed to measure the time delay $\Delta T_1$ between receipt of a signal directly from a target in the first plane of the X-beam and receipt of a signal from the target in that first plane but reflected from a remote surface. A second correlator is employed to measure the time delay $\Delta T_2$ between receipt of a signal from the target in the first plane and subsequent receipt of a signal from that target in the second plane as the first and second planes rotate. Receiver altitude $R_H$ is measured by conventional means and thereafter target range and/or elevation is calculated in response to $\theta$, $\gamma$, $\Delta T_1$, $\Delta T_2$ and $R_H$.

10 Claims, 5 Drawing Figures

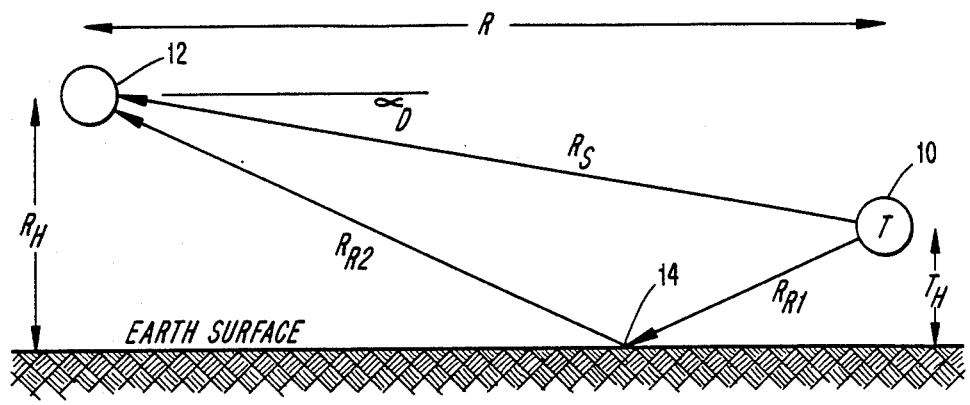
Fig. 1
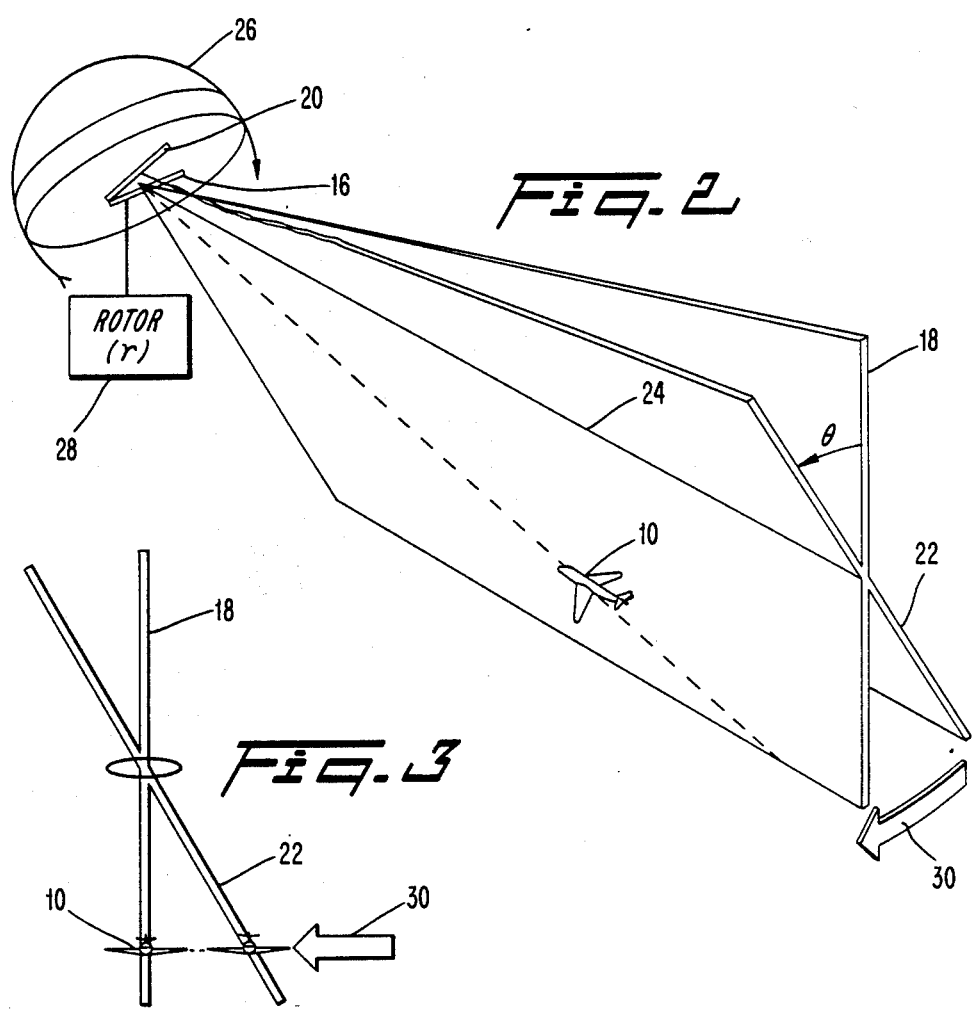
Fig. 2
Fig. 3

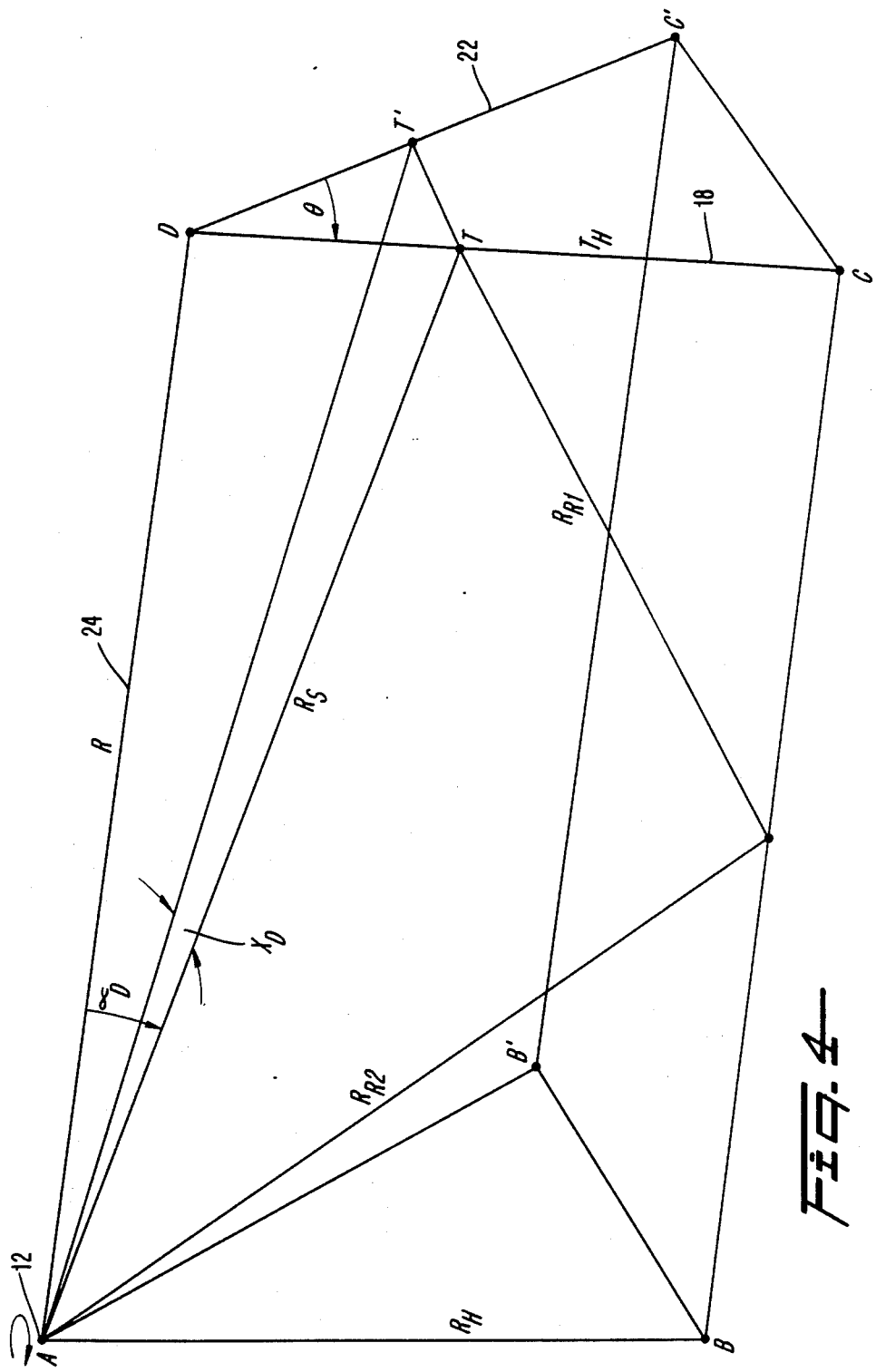

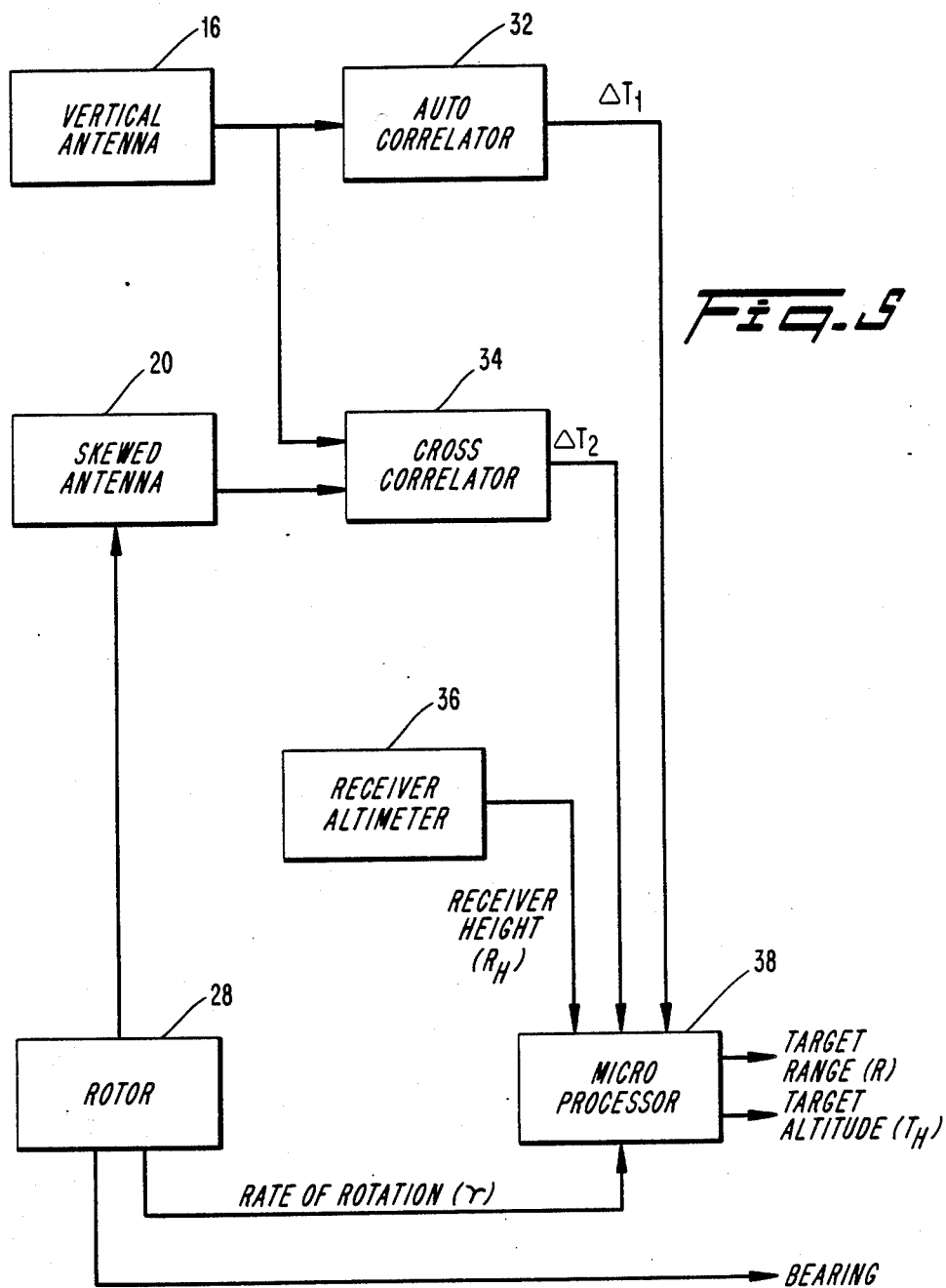

DEPRESSION ANGLE RANGING SYSTEM AND METHODS

FIELD OF THE INVENTION

The present invention relates to a passive system for establishing the range and/or altitude of a signal emitting target.

BACKGROUND INFORMATION

Attempts have been made in the past to identify the range and/or altitude of a large number of electromagnetic radiating targets quickly and to a high degree of accuracy, precision and resolution. Preferably, the range and/or altitude is established by a passive method, that is a method which does not require the locator to emit an electromagnetic signal. Previous attempts to provide such systems include techniques known as the Two Platform Cooperative Location technique, the Self Passive Location System, the Passive Ranging On Scanning Emitters technique (PROSE), the Passive Ranging On Non-Scanning Emitters technique (PRONSE), and the Passive Rotating Receiver Ranging technique (PR$^3$).

The Two-Platform technique operates well in connection with a single emitting target, but when more than two emitting targets are within range of such a system, the system gives a set of target locations and ghosts equal to the square of the number of emitters. Although deghosting techniques are available to eliminate the ghost or false locations, these techniques require a long time and considerable computer capacity to implement. The Self Passive Location technique uses a single receiver platform, but only works on emitters which maintain a constant heading and velocity for a 10 to 15 minute period.

The PROSE system is effective only on targets which emit a scanning signal and whose scan rate is known. The PRONSE technique solves this problem, but requires two or more widely separated sensors. Although such sensors may physically be put on each wingtip of an airborne fuselage, it is necessary to know the location and altitude of each sensor with respect to one another with a great degree of precision. The flexibility of large structures, such as an airborne fuselage or wings, mandates the use of an auxiliary locating system, such as an inertial or laser system, to track the relative movement of the sensors. The PR$^3$ system has the same problems as the PRONSE system. In addition, since the PR$^3$ system involves a rotating receiver, there is a requirement of knowing the pointing angle of each sensor to a precision of greater than one part per million.

The subject invention improves upon a known prior art technique referred to as a multi-path ranging system or a Time Delay Of Arrival (TDOA) System. A TDOA system or technique relies upon the fact that the surface of the earth or sea will reflect electromagnetic waves emitted from a target. For example, in FIG. 1 there is illustrated a target 10 which emits electromagnetic waves and a receiver 12 which is capable of receiving those waves. When target 10 emits an electromagnetic signal, receiver 12 detects a wave train consisting of the sum of signals traveling the direct path $R_S$ between target 10 and receiver 12 and signals traveling by means of a reflection path comprising $R_{R1}$, ground bounce point 14, and $R_{R2}$. The difference in transit time $\Delta T_1$ between the direct and reflected waves is determined by finding the differential time associated with the non-zero maxima of the autocorrellagram of the received time history. When this time difference $\Delta T_1$ is multiplied by the velocity of a electromagnetic propagation ($v$), the difference in path length $\Delta R$ is known ($\Delta R = \Delta T_1 \cdot v$). This information, the altitude ($R_H$) of the receiver 12, and the depression angle ($\alpha_D$) of target 10 may be used to determine the range R of target 10 in accordance with the following equation:

$$R = [(R_H)^2 - (\Delta R/2)^2] \cdot \cos(\alpha_D) / [(\Delta R/2) - (R_H) \cdot \sin(\alpha_D)] \quad (1);$$

where:

R is the range between target 10 and receiver 12;
$R_H$ is the altitude of receiver 12;
$\Delta R$ is the difference between the length of the direct path ($R_S$) and the reflection path ($R_{R1} + R_{R2}$); and
$\alpha_D$ is the target 10 depression angle.

Once the range R has been established, the target altitude ($T_H$) is:

$$T_H = R_H - R \cdot \tan(\alpha_D) \quad (2).$$

It should be understood that the above equations are only approximate and that corrections can be added to account for the curvature of the earth.

Range and altitude can also be determined by using the path length difference and other angles, such as the depression angle between the direct and reflected paths. The major problem with such prior art multipath ranging systems lies in the accuracy required in measuring the depression angle used. For example, an error of less than 0.1 degrees of arc in depression angle $\alpha_D$ produces a range error exceeding 10 percent.

Accordingly, it is an object of the subject invention to provide a system and related methods which permit the passive location of a large number of electromagnetic radiating targets to be determined quickly and to a high degree of accuracy, precision and resolution.

It is another object of the subject invention which overcomes the disadvantages of inaccurate depression angle measurement found in prior art multipath or TDOA systems.

Additional objects and advantages of the invention will be set forth in the description which follows and, in part, will be obvious from the description or may be learned by practice of the invention. The objects and advantages of the invention may be realized and obtained by means of the instrumentalities and combinations particularly pointed out in the appended claims.

SUMMARY OF THE INVENTION

To achieve the foregoing objects and in accordance with the purposes of the invention as embodied and broadly described herein, a system and related methods are provided for detecting the range and/or elevation of a target. The system comprises an antenna system having first and second planes of receipt which are inclined a fixed angle ($\theta$) from one another, the antenna system being located along the line of intersection of the planes and the antenna system including means for sweeping the line of intersection at a known rate of sweep ($\gamma$); means for measuring the delay ($\Delta T_1$) between receipt of a signal directly from the target in the first plane and reflected from a remote surface in the first plane; means for measuring the delay ($\Delta T_2$) between receipt of a signal from the target in the first plane and then in the second plane as the first and second planes rotate; means for measuring the height ($R_H$) of the antenna system; and means for calculating the range and/or elevation of the target in response to $\theta$, $\gamma$, $\Delta T_1$, $\Delta T_2$ and $R_H$.

Preferably, the means for calculating determines target range R using the relationship:

$$R = [(R_H)^2 - (\Delta T_1 \cdot v/2)^2] \cdot \cos(\alpha_D)/[\Delta T_1 \cdot v/2 - R_H \cdot \sin(\alpha_D)]$$

where: $v$ = the speed of said signal; and $$\alpha_D = \tan^{-1}[\sin(\Delta T_2 \cdot \tau)/\tan(\theta)].$$

It is also preferable that the means for calculating determines target elevation $T_H$ using the relationship:

$$T_H = R_H - R \cdot \tan(\alpha_D)$$

where:
$R = [(R_H)^2 - (\Delta T_1 \cdot v/2)^2] \cdot \cos(\alpha_D)/[\Delta T_1 \cdot v/2 - R_H \cdot \sin(\alpha_D)]$
$v$ = the speed of said signals; and
$\alpha_D = \tan^{-1}[\sin(\Delta T_2 \cdot \tau)/\tan(\theta)].$

BRIEF DESCRIPTION OF THE DRAWINGS

The accompanying drawings, which are incorporated in and constitute a part of the specification, illustrate a preferred embodiment of the invention and, together with the general description of the invention given above and the detailed description of the preferred embodiment given below, serve to explain the principles of the invention.

FIG. 1 is a vector diagram which is used to explain prior art time delay of arrival systems.

FIG. 2 is a perspective diagram of an X-beam antenna system which incorporates the teachings of the present invention;

FIG. 3 is an end view of the X-beam system of FIG. 2;

FIG. 4 is a vector diagram which illustrates the principles of the subject invention; and FIG. 5 is a block diagram of a system incorporating the teachings of the subject invention.

DESCRIPTION OF THE PREFERRED EMBODIMENTS

Reference will now be made in detail to the present preferred embodiment of the invention as illustrated in the accompanying drawings.

The subject invention combines the Time Difference Of Arrival (TDOA) ranging system of the prior art described above with a depression angle measuring system to provide the necessary accuracy required to make the TDOA ranging system more effective. The depression angle measuring system employed is in part the subject of a co-pending application Ser. No. 655,705, now U.S. Pat. No. 4,626,861 filed Sept. 28, 1984 by Mr. Edward R. Wiley, entitled "Two Angle Range and Altitude Measurement System and Methods," and assigned to the same assignee as the subject application. The contents of that application are herein expressly incorporated by reference.

As noted in that application, target depression angle $\alpha_D$ may be accurately defined through utilization of an "X" or "V" beam receiver system. This system may, for example, include an antenna system comprising a first antenna 16 which is oriented to produce a first plane or receipt 18 as is illustrated in FIG. 2 herein. This form of antenna system further comprises a second antenna 20 which is oriented to form a second plane of receipt 22 which is inclined a fixed angle $\theta$ from plane 18. Antennas 16 and 20 form a portion of receiver 12 and are located along the line of intersection 24 formed by planes 18 and 22. Antennas 16 and 20 are preferably located within an airborne rotodome 26 and are rotated at a rate of sweep $\gamma$ by a rotor 28 in a direction indicated by arrow 30.

Accordingly, as may be seen in FIGS. 2 and 3, target 10 first falls within plane 18 and, subsequently, upon continued rotation falls within plane 22. The point of intersection of target 10 and plane 18 is illustrated as point T in FIG. 4 wherein plane 18 is defined by the enclosure ABCD. The point of intersection of target 10 and plane 22 is shown as T' in FIG. 4 wherein plane 22 is defined by the enclosure AB'C'D.

With receiver 12 located at point A, ATT' defines a triangular sliver which fits tightly within a tent formed by that portion of planes 18 and 22 below line of intersection 24. If the time of delay between receipt of a signal from target 10 in plane 18 and receipt of a signal from target 10 in plane 22 ($\Delta T_2$) is measured, the product of this time and the angular rate of sweep $\gamma$ of receiver 12 defines azimuth angle $X_D$ of sliver ATT' ($X_D = \Delta T_2 \cdot \gamma$). Accordingly, as noted in the corresponding Wiley application, depression angle $\alpha_D$ may be defined as follows:

$$\alpha_D = \tan^{-1}[\sin(\Delta T_2 \cdot \tau)/\tan \theta] \qquad (3).$$

Once the depression angle $\alpha_D$ is known, range R may be readily calculated as noted above in equation (1). Substituting equation (3) into equation (1) and using $\Delta R = \Delta T_1 \cdot \gamma$:

$$R = \frac{[(R_H)^2 - (\Delta T_1 \cdot v/2)^2] \cdot [\cos(\tan^{-1}[\sin(\Delta T_2 \cdot \tau)/\tan \theta])]}{[(\Delta T_1 \cdot v/2) - R_H \cdot \sin(\tan^{-1}[\sin(\Delta T_2 \cdot \tau)/\tan \theta])]} \qquad (4)$$

Preferably, intercept line 24 is parallel to a line which is tangent to the surface of the earth at a point directly below receiver 12, or line of intersection 24 intersects the horizon as seen from receiver 12. It is also preferable that angle $\theta$ between planes 18 and 22 be in the range of 5 to 30 degrees and that rotational rate $\gamma$ be on the order of 36 degrees per second. It is still further preferable that plane 18 be oriented in a vertical manner normal to the surface of the earth. Moreover, it should be understood that the term "depression angle" is to be considered synonymous with "elevation angle," and target 12 may be either above or below line of intersection 24.

FIG. 5 is a block diagram of a system implementing the teachings of the subject invention. The system of FIG. 5 includes vertical antenna 16, skewed antenna 20, rotor 28, auto correlator 32, cross correlator 34, receiver altimeter 36, and microprocessor 38. The function of vertical antenna 16, skewed antenna 18, and rotor 26 was discussed above. Auto correlator 32 operates as is known in connection with prior art TDOA systems to produce a $\Delta T_1$ which indicates the time differential between receipt of a signal from target 10 directly in first plane 18 and receipt of a signal from target 10 reflected from a remote surface, namely ground point 14, which is also located in plane 18.

In a similar manner, cross correlator 34 which is connected to the output of both vertical antenna 16 and skewed antenna 20 produces $\Delta T_2$ which represents the difference in time between receipt of a signal in plane 18 and subsequent receipt of a signal in plane 22 from target 10 as planes 18 and 22 rotate.

Altimeter 36 may be of a conventional variety capable of indicating the height $R_H$ of the antenna system which includes antennas 16 and 20.

With fixed angle $\theta$ between planes 18 and 22, rate of rotation $\gamma$, $\Delta T_1$, $\Delta T_2$ and $R_H$ fed to microprocessor 38, microprocessor 38 may be operated as should be apparent to one skilled in the art to calculate range R in accordance with the above-set forth equation (4).

In addition, given equation (2) target elevation $T_H$ is also readily calculatable given the input information $\theta$, $\gamma$, $\Delta T_1$, $\Delta T_2$ and $R_H$ along with $\nu$, namely the speed of an electromagnetic signal through the atmosphere. Accordingly, the subject invention provides a system and accompanying methods which permit target range and/or altitude to be passively determined quickly and accurately.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicant's general inventive concept.

I claim:

1. A system for detecting the range and/or elevation of a target comprising:
   (a) an antenna system having first and second planes of receipt which are inclined a fixed angle ($\theta$) from one another, said antenna system being located along the line of intersection of said planes and said antenna system including means for sweeping said line of intersection at a known rate of sweep ($\gamma$);
   (b) means for measuring the delay ($\Delta T_1$) between receipt of a signal directly from said target in said first plane and reflected from a remote surface in said first plane;
   (c) means for measuring the delay ($\Delta T_2$) between receipt of a signal from said target in said first plane and then in said second plane as said first and second planes rotate;
   (d) means for measuring the height ($R_H$) of said antenna system; and
   (e) means for calculating the range and/or elevation of said target in response to $\theta$, $\gamma$, $\Delta T_1$, $\Delta T_2$ and $R_H$.

2. The system of claim 1 wherein said means for calculating determines target range R using the relationship:

$$R = [(R_H)^2 - (\Delta T_1 \cdot \nu/2)^2] \cdot \cos (\alpha_D)/[\Delta T_1 \cdot \nu/2 - R_H \sin (\alpha_D)]$$

where:
$\nu$ = the speed of said signal; and
$\alpha_D = \tan^{-1} [\sin (\Delta T_2 \cdot \tau)/\tan (\theta)]$.

3. The system of claim 1 wherein said means for calculating determines target elevation $T_H$ using the relationship:

$$T_H = R_H - R \cdot \tan (\alpha_D)$$

where:
$R = [(R_H)^2 - (\Delta T_1 \cdot \nu/2)^2] \cdot \cos (\alpha_D)/[\Delta T_1 \cdot \nu/2 - R_H \sin (\alpha_D)]$
$\nu$ = the speed of said signals; and
$\alpha = \tan^{-1} [\sin (\Delta T_2 \cdot \tau)/\tan (\theta)]$.

4. The system of claim 2 wherein said means for calculating determines target elevation $T_H$ using the relationship:

$$T_H = R_H - R \cdot \tan (\alpha_D).$$

5. A method for detecting the range and/or elevation of a target employing an antenna system having first and second planes of receipt which are inclined a fixed angle ($\theta$) from one another, said antenna system being located along the line of intersection of said planes and said antenna aystem including means for sweeping said line of intersection at a known rate of sweep ($\gamma$), the method comprising the steps of:
   (a) measuring the delay ($\Delta T_1$) between receipt of a signal directly from said target in said first plane and reflected from a remote surface in said first plane;
   (b) measuring the delay ($\Delta T_2$) between receipt of a signal from said target first in said first plane and then in said second plane as said first and second planes rotate;
   (c) measuring the height ($R_H$) of said antenna system; and
   (d) calculating the range and/or elevation of said target in response to $\theta$, $\gamma$, $\Delta T_1$, $\Delta T_2$ and $R_H$.

6. The method of any one of claim 5 including the step of aligning said line of intersection parallel to a line which is tangent to the surface of the earth at a point directly below said antenna system.

7. The method of any one of claim 5 including the step of aligning said line of intersection to intersect the horizon as seen from said antenna system.

8. The method of claim 5 wherein said steps of calculating includes determining target range R using the relationship:

$$R = [(R_H)^2 - (\Delta T_1 \cdot \nu/2)^2] \cdot \cos (\alpha_D)/[\Delta T_1 \cdot \nu/2 - R_H \sin (\alpha_D)]$$

where:
$\nu$ = the speed of said signal; and
$\alpha_D = \tan^{-1} [\sin (\Delta T_2 \cdot \tau)/\tan (\theta)]$.

9. The method of claim 5 wherein said step of calculating includes determining target elevation $T_H$ using the relationship:

$$T_H = R_H - R \cdot \tan (\alpha_D)$$

where:
$R = [(R_H)^2 - (\Delta T_1 \cdot \nu/2)^2] \cdot \cos (\alpha_D)/[\Delta T_1 \cdot \nu/2 - R_H \sin (\alpha_D)]$
$\nu$ = the speed of said signals; and
$\alpha_D = \tan^{-1} [\sin (\Delta T_2 \cdot \tau)/\tan (\theta)]$.

10. The method of claim 8 wherein said step of calculating includes determining target elevation $T_H$ using the relationship:

$$T_H = R_H - R \cdot \tan (\alpha_D).$$

* * * * *